(12) United States Patent
Fujimoto et al.

(10) Patent No.: US 9,793,055 B2
(45) Date of Patent: Oct. 17, 2017

(54) ELECTRONIC DEVICE AND METHOD OF MANUFACTURING THE SAME

(71) Applicant: KABUSHIKI KAISHA TOSHIBA, Minato-ku, Tokyo (JP)

(72) Inventors: Akira Fujimoto, Kawasaki Kanagawa (JP); Naofumi Nakamura, Tokyo (JP); Tamio Ikehashi, Yokohama Kanagawa (JP)

(73) Assignee: KABUSHIKI KAISHA TOSHIBA, Tokyo (JP)

( * ) Notice: Subject to any disclaimer, the term of this patent is extended or adjusted under 35 U.S.C. 154(b) by 133 days.

(21) Appl. No.: 14/848,349

(22) Filed: Sep. 9, 2015

(65) Prior Publication Data

US 2016/0293336 A1    Oct. 6, 2016

(30) Foreign Application Priority Data

Apr. 3, 2015    (JP) .................................. 2015-077061

(51) Int. Cl.
*H01G 5/16*    (2006.01)
*H01G 5/011*    (2006.01)
*H01G 5/014*    (2006.01)
*H01G 5/18*    (2006.01)

(52) U.S. Cl.
CPC ............... *H01G 5/16* (2013.01); *H01G 5/011* (2013.01); *H01G 5/014* (2013.01); *H01G 5/18* (2013.01)

(58) Field of Classification Search
CPC .......... H01G 5/16; H01G 5/011; H01G 5/014; H01G 5/18
See application file for complete search history.

(56) References Cited

U.S. PATENT DOCUMENTS

| 7,176,111 B2 | 2/2007 | Baert et al. | |
| 2004/0214543 A1* | 10/2004 | Osone | H01G 5/16 455/197.2 |
| 2011/0290023 A1* | 12/2011 | Takagi | G01C 19/5783 73/514.32 |
| 2012/0139064 A1 | 6/2012 | Nakatani et al. | |
| 2014/0284188 A1* | 9/2014 | Yamazaki | H01G 5/18 200/181 |

FOREIGN PATENT DOCUMENTS

| JP | 2013003067 A | 1/2013 |
| JP | 2014235029 A | 12/2014 |

OTHER PUBLICATIONS

Kirsten, et al., "Deposition of thick doped polysilicon films with low stress in an epi-taxial reactor for surface micromachining applications", Elsevier Science S.A.; Thin Solid Films 259, 1995; pp. 181-187.

* cited by examiner

*Primary Examiner* — Dion R Ferguson
(74) *Attorney, Agent, or Firm* — Holtz, Holtz & Volek PC (57) ABSTRACT

According to one embodiment, an electronic device includes an underlying region, a variable capacitor including fixed electrodes and movable electrodes alternately arranged in a direction not perpendicular to a main surface of the underlying region, and a protective film which covers the variable capacitor and includes a conductive portion electrically connected to the fixed electrodes and having a hole.

15 Claims, 14 Drawing Sheets

ELECTRONIC DEVICE AND METHOD OF MANUFACTURING THE SAME

CROSS-REFERENCE TO RELATED APPLICATIONS

This application is based upon and claims the benefit of priority from Japanese Patent Application No. 2015-077061, filed Apr. 3, 2015, the entire contents of which are incorporated herein by reference.

FIELD

Embodiments described herein relate generally to an electronic device and a method of manufacturing the same.

BACKGROUND

As a variable capacitor using micro electro-mechanical systems (MEMS) technology, a variable capacitor comprising fixed electrodes and movable electrodes alternately arranged parallel to the main surface of an underlying region has been proposed. In a variable capacitor having such a structure, fixed electrodes are generally connected to a pad electrode by an interconnect provided in an underlying region. In this case, the fixed electrodes are connected to the interconnect via a contact provided on the surface of the underlying region.

However, in conventional variable capacitors using MEMS technology, there has been a problem in reliably connecting fixed electrodes.

DETAILED DESCRIPTION

In general, according to one embodiment, an electronic device includes: an underlying region; a variable capacitor including fixed electrodes and movable electrodes alternately arranged in a direction not perpendicular to a main surface of the underlying region; and a protective film which covers the variable capacitor and includes a conductive portion electrically connected to the fixed electrodes and having a hole.

Embodiments will be described hereinafter with reference to the accompanying drawings.

First Embodiment

First, an electronic device of the first embodiment will be described. The electronic device comprises a variable capacitor formed by using MEMS technology. Further, the electronic device can be used as an acceleration sensor.

Figure 1:
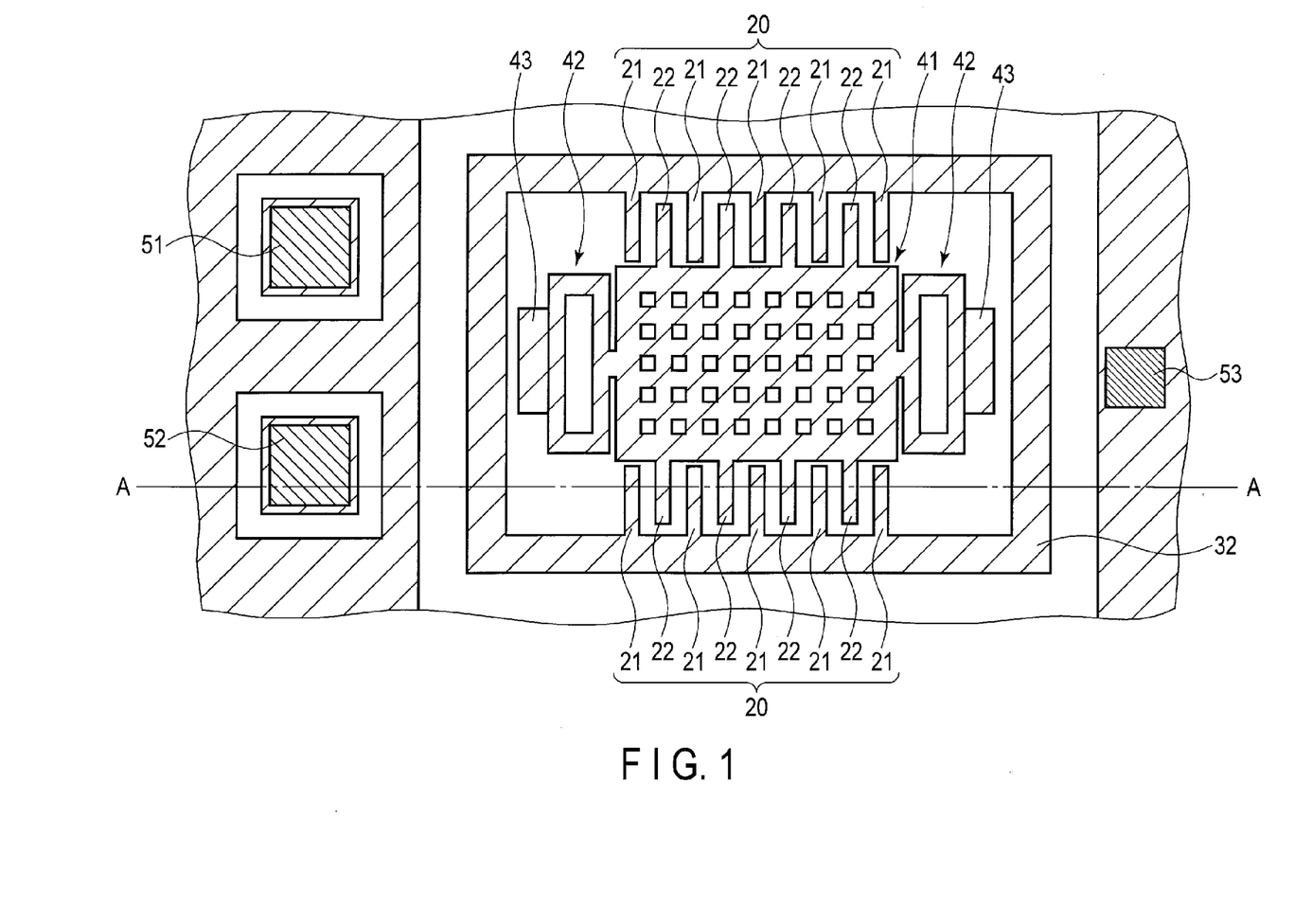
FIG. 1 is an exemplary plan view of the structure of the electronic device of the first embodiment.
Figure 2:
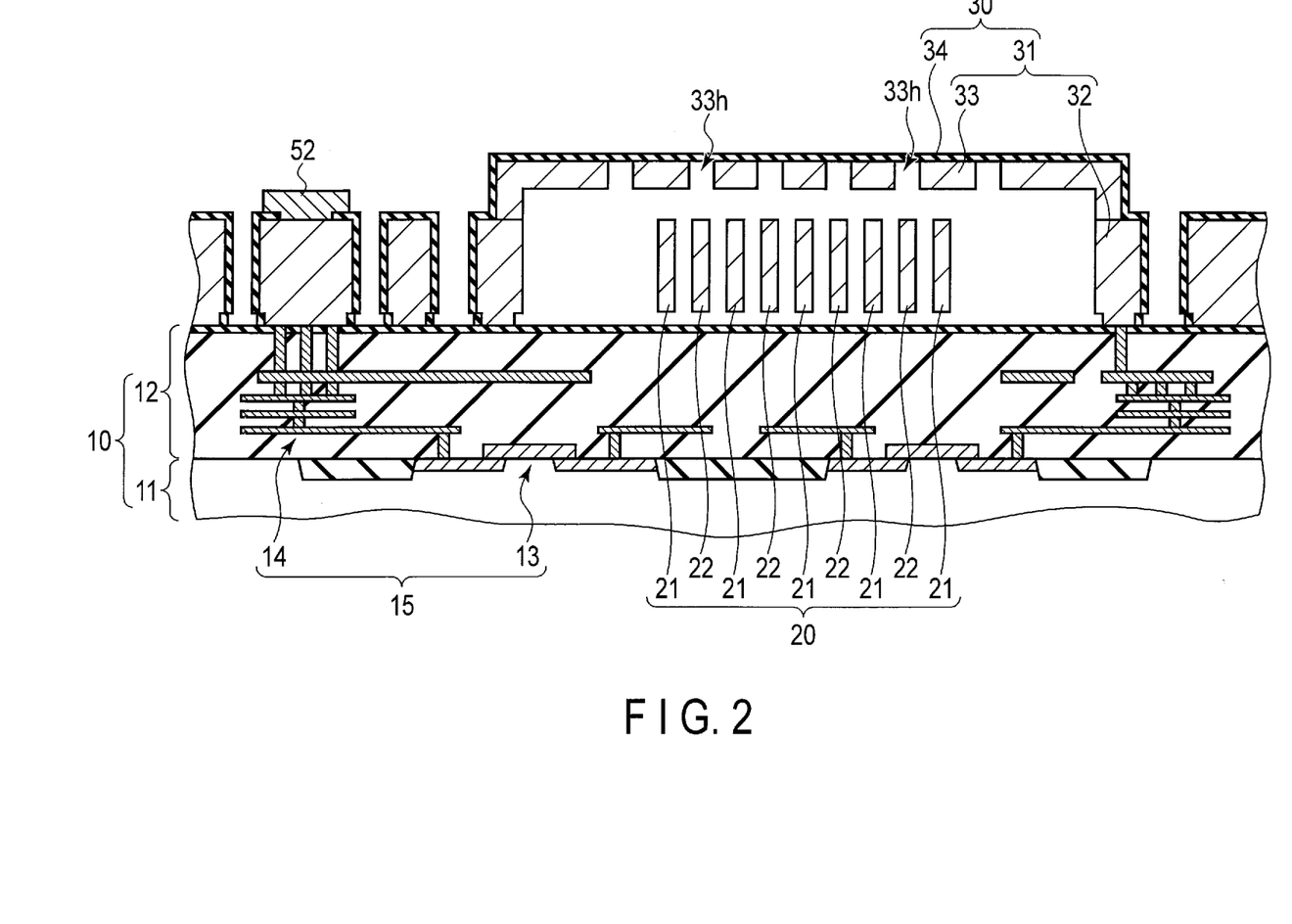
FIG. 2 is an exemplary sectional view of the structure of the electronic device of the first embodiment.

FIG. 1 is an exemplary plan view of the structure of the electronic device of the first embodiment. FIG. 2 is a sectional view taken along line A-A of FIG. 1. Note that a part of a protective film is omitted in the plan view of FIG. 1 for easier comprehension.

As shown in the drawing, an underlying region 10 comprises a semiconductor substrate 11 and an insulating region 12. A MOS transistor 13 is formed in the surface region of the semiconductor substrate 11, and an interconnect 14 is formed in the insulating region 12. That is, the underlying region 10 is provided with a circuit 15 comprising the MOS transistor 13 and the interconnect 14. The circuit 15 comprises a drive circuit configured to drive a variable capacitor 20 which will be described below.

The variable capacitor 20 is provided on the underlying region 10. The variable capacitor 20 comprises a plurality of fixed electrodes 21 and a plurality of movable electrodes 22 alternately arranged in a direction not perpendicular to the main surface of the underlying region 10. In the present embodiment, the plurality of fixed electrodes 21 and the plurality of movable electrodes 22 are alternately arranged parallel to the main surface of the underlying region 10. The fixed electrode 21 and the movable electrode 22 both have comb-like plane patterns, and the fixed electrode 21 and the movable electrode 22 adjacent to each other are facing each other. The gap between the fixed electrode 21 and the movable electrode 22 adjacent to each other is approximately within the range of 0.1 to 1 µm. Further, the heights of the fixed electrode 21 and the movable electrode 22 are approximately within the range of 10 to 50 µm. The fixed electrodes 21 are fixed, and the movable electrodes 22 are movable parallel to the direction in which the fixed electrodes 21 and the movable electrodes 22 are arranged. In the present embodiment, the movable electrodes 22 can move in the direction parallel to the main surface of the underlying region 10 (horizontal direction in FIGS. 1 and 2). As the movable electrodes 22 move the horizontal direction, the distances between the movable electrodes 22 and the fixed electrodes 21 change and thus the capacitance between the movable electrodes 22 and the fixed electrodes 21 adjacent thereto changes. It is possible to obtain acceleration by detecting the change of the capacitance.

The variable capacitor 20 is covered with a protective film (cap film) 30, and a cavity is formed on the inner side of the protective film 30. The protective film 30 comprises a conductive portion 31 electrically connected to the fixed electrodes 21 and an upper layer portion 34 provided on the conductive portion 31. The conductive portion 31 comprises a first conductive portion 32 located in the sidewall portion of the protective film 30 and a second conductive portion 33 located in the upper portion of the protective film 30. In the present embodiment, the first conductive portion 32 is electrically connected to the fixed electrodes 21. More specifically, the first conductive portion 32 is connected to the side surfaces of the fixed electrodes 21. More specifically, the first conductive portion 32 and the fixed electrodes 21 are formed integrally. The second conductive portion 33 is provided with a plurality of holes 33h. These holes 33h are provided to remove a sacrificial layer therethrough which will be described later. The upper layer portion 34 is formed of an insulating layer (for example, a silicon nitride film) and closes the holes 33h.

The movable electrodes 22 are connected to a mass structure portion 41 the pattern area of which is greater than the total pattern area of the movable electrodes 22. More specifically, the movable electrodes 22 and the mass structure portion 41 are integrally formed. It becomes possible by providing the mass structure portion 41 to increase accuracy in detecting acceleration. The mass structure portion 41 is connected to a pair of spring portions 42, and the pair of spring portions 42 is connected to a pair of anchor portions (fixed portions) 43.

On the outer side of the protective film 30, a pad electrode 51 and a pad electrode 52 are formed. Pad electrode 51 is electrically connected to the fixed electrodes 21 via the interconnect 14 and the first conductive portion 32. Pad electrode 52 is electrically connected to the movable electrodes 22 via the interconnect 14, the anchor portions 43, the spring portions 42 and the mass structure portion 41. Therefore, the voltage of the fixed electrodes 21 is the same as the voltage of pad electrode 51, and the voltage of the movable electrodes 22 is the same as the voltage of pad electrode 52. Further, an alignment mark 53 is formed on the outer side of the protective film 30.

The above-described fixed electrodes 21, movable electrodes 22, first conductive portion 32, mass structure portion 41, spring portions 42 and anchor portions 43 are formed of the same material in the same process. These components are formed of a semiconductor material. More specifically, SiGe is used as the semiconductor material. The second conductive portion 33 is also formed of a material the same as that of the first conductive portion 32.

As described above, in the present embodiment, the protective film 30 comprises the conductive portion 31, and the conductive portion 31 is electrically connected to the fixed electrodes 21. More specifically, in the present embodiment, the first conductive portion 32 located in the sidewall portions of the protective film 30 is connected to the fixed electrodes 21. Therefore, the fixed electrodes 21 can be electrically connected to pad electrode 51 via the conductive portion 31 (first conductive portion 32).

Conventionally, a variable capacitor using MEMS technology has a minute structure, and therefore there has been a problem in accurately aligning fixed electrodes with a contact pattern formed on the surface of an underlying region. That is, since the fixed electrode material layer formed on the underlying region is considerably thick, it is difficult to secure a necessary and sufficient focal depth for alignment. Consequently, there has been a problem in the accuracy of alignment with the contact pattern formed on the surface of the underlying region.

The electronic device of the present embodiment having the above-described structure can reliably connect the fixed electrodes 21 to the conductive portion 31 (first conductive portion 32) and can reliably connect the fixed electrodes 21 to pat electrode 51 electrically without performing a conventional difficult alignment operation. Therefore, an electronic device comprising a variable capacitor having minute structures using MEMS technology can be reliably obtained.

Further, according to the present embodiment, the conductive portion 31 also functions as a part of the protective film 30, and thus it is possible to obtain an electronic device comprising a variable capacitor having minute structures using MEMS technology without significantly increasing the number of manufacturing processes.

Second Embodiment

Next, an electronic device of the second embodiment will be described. Note that, since basic points are similar to those of the first embodiment, the points described in the first embodiment will be omitted.

Figure 3:
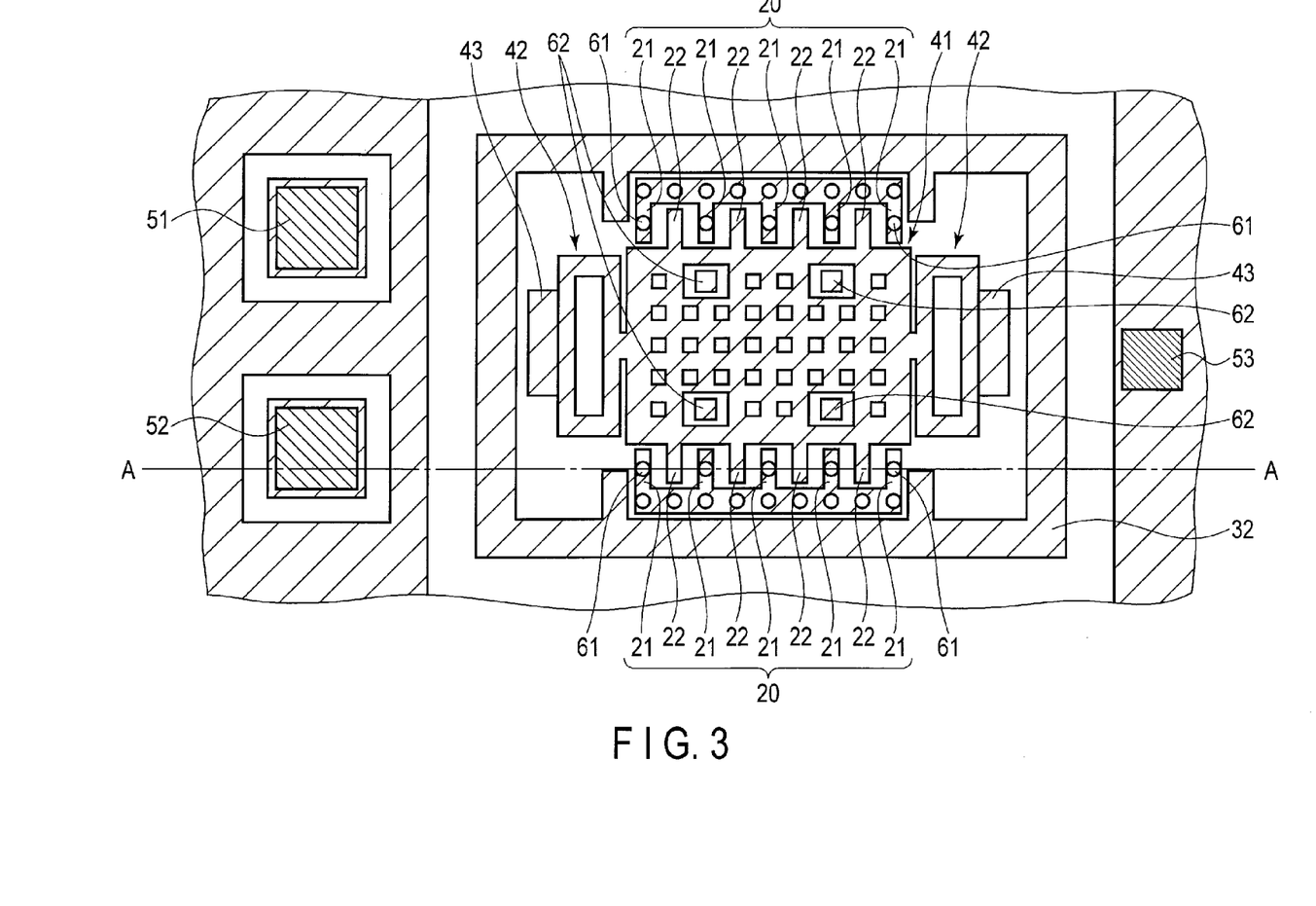
FIG. 3 is an exemplary plan view of the structure of the electronic device of the second embodiment.
Figure 4:
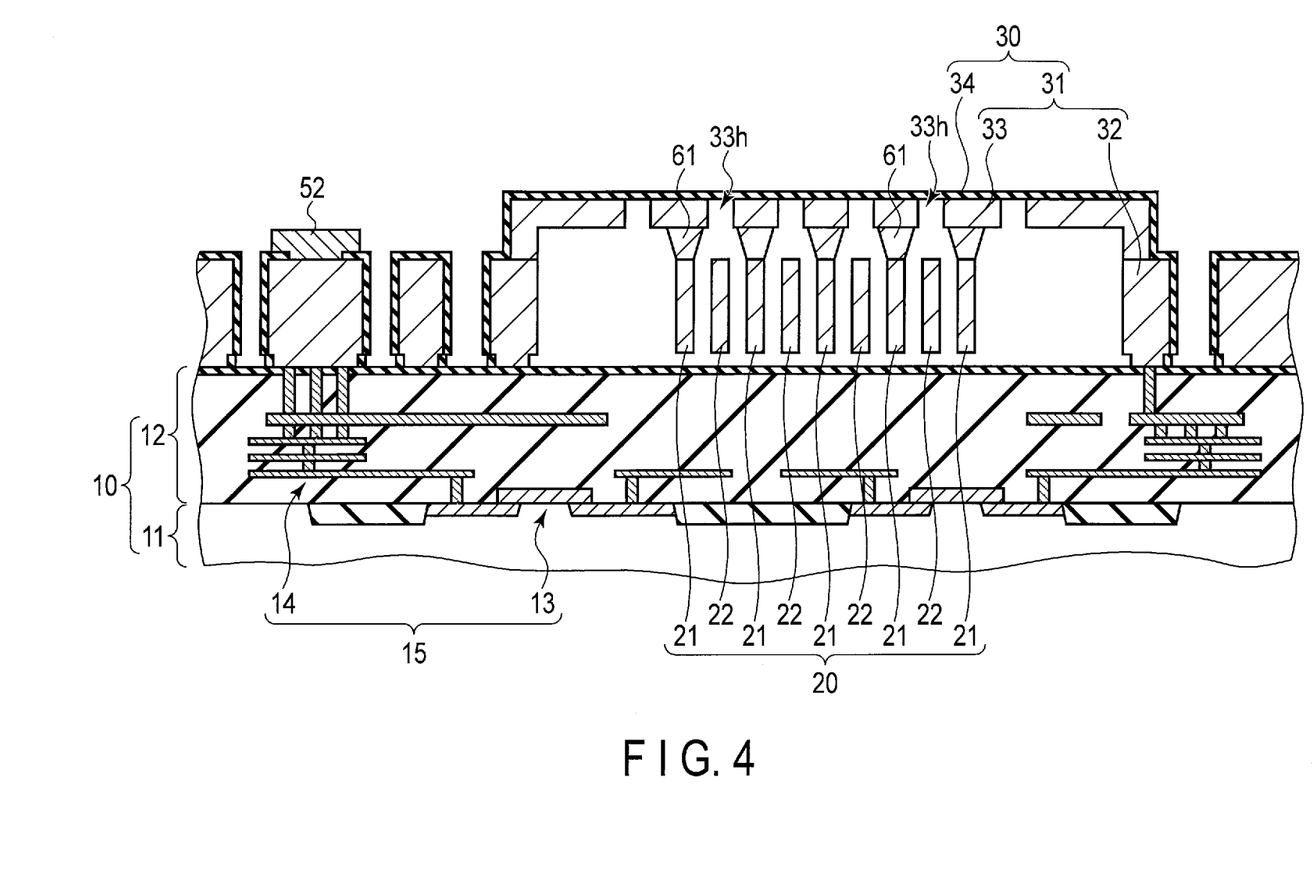
FIG. 4 is an exemplary sectional view of the structure of the electronic device of the second embodiment.

FIG. 3 is an exemplary plan view of the structure of the electronic device of the second embodiment. FIG. 4 is a sectional view taken along line A-A of FIG. 3. Note that a part of a protective film is omitted in the plan view of FIG. 3 for easier comprehension.

In the present embodiment, fixed electrodes 21 are electrically connected to a second conductive portion 33. More specifically, the fixed electrodes 21 are electrically connected to the second conductive portion 33 via plugs 61. Further, the second conductive portion 33 is electrically connected to a pad electrode 51. The basic structures other than those described above are similar to those of the first embodiment.

Further, in the present embodiment, a plurality of pillar portions 62 are formed between an underlying region 10 and a protective film 30, and thus the protective film 30 is reliably supported by the pillar portions 62. The pillar portions 62 are formed of a material the same as those of the fixed electrodes 21, movable electrodes 22, a first conductive portion 32 and the second conductive portion 33.

Also in the present embodiment, the protective film 30 comprises a conductive portion 31, and the conductive portion 31 is electrically connected to the fixed electrodes 21. More specifically, in the present embodiment, the second conductive portion 33 located in the upper portion of the protective film 30 is electrically connected to the fixed electrodes 21 via the plugs 61. Therefore, the fixed electrodes 21 can be electrically connected to pad electrode 51 via the conductive portion 31 (second conductive portion 33). Although the plugs 61 are required to be accurately aligned with the fixed electrodes 21, a necessary and sufficient focal depth for alignment can be easily secured since the plugs 61 only need to be aligned with the upper surfaces of the fixed electrodes 21. Therefore, without performing a conventional difficult alignment operation, it is possible to reliably connect the fixed electrodes 21 to the conductive portion 31 (second conductive portion 33) via the plugs 61 and to reliably connect the fixed electrodes 21 to pad electrode 51 electrically. Consequently, an electronic device comprising a variable capacitor having minute structures using MEMS technology can be reliably obtained.

Further, since the conductive portion 31 functions as a part of the protective film also in the present embodiment, it is possible to obtain an electronic device comprising a variable capacitor having minute structures using MEMS technology without significantly increasing the number of manufacturing processes.

Third Embodiment

Next, an electronic device of the third embodiment will be described. Note that, since basic points are similar to those of the first and second embodiments, the points described in the first and second embodiments will be omitted.

Figure 5:
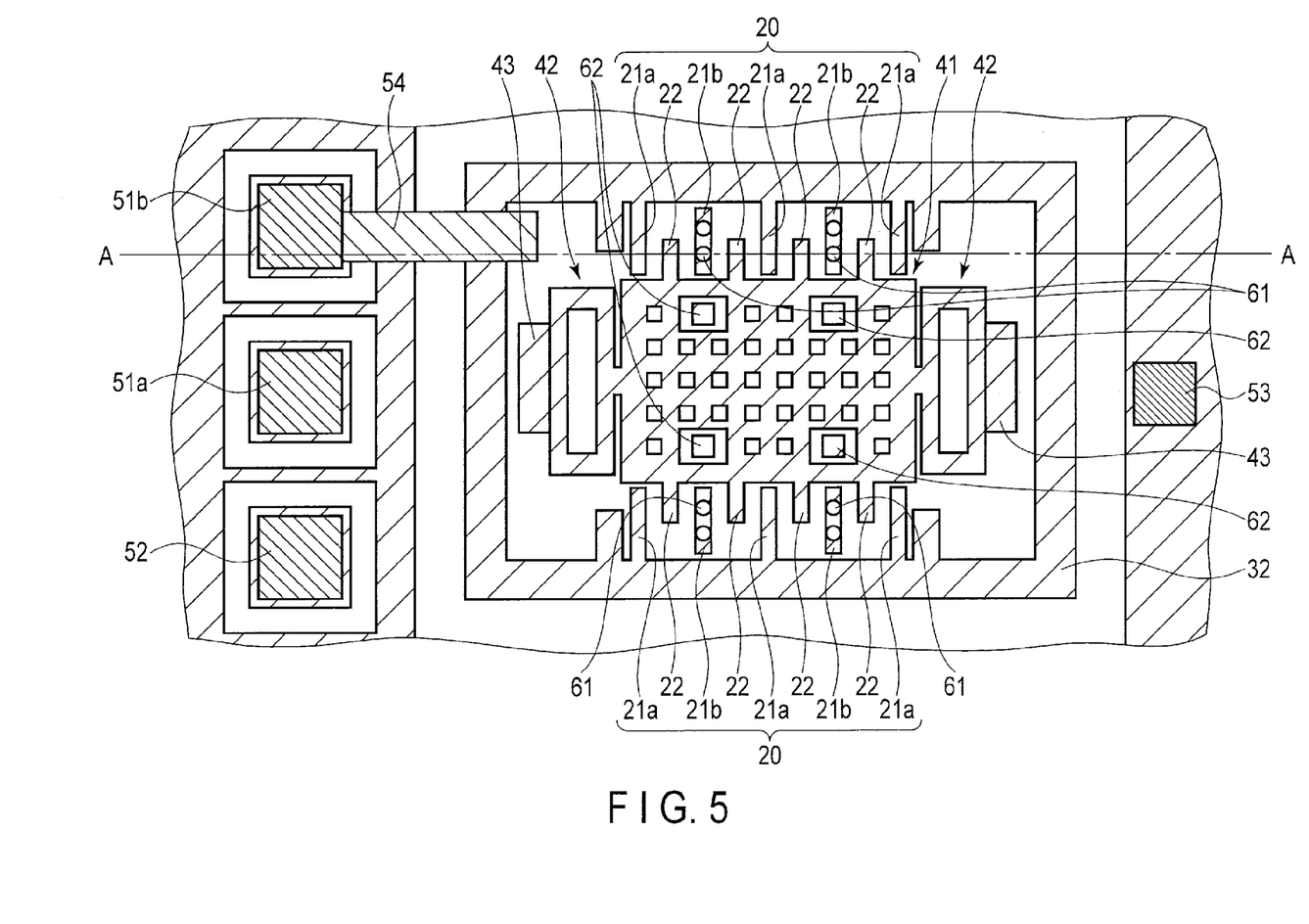
FIG. 5 is an exemplary plan view of the structure of the electronic device of the third embodiment.
Figure 6:
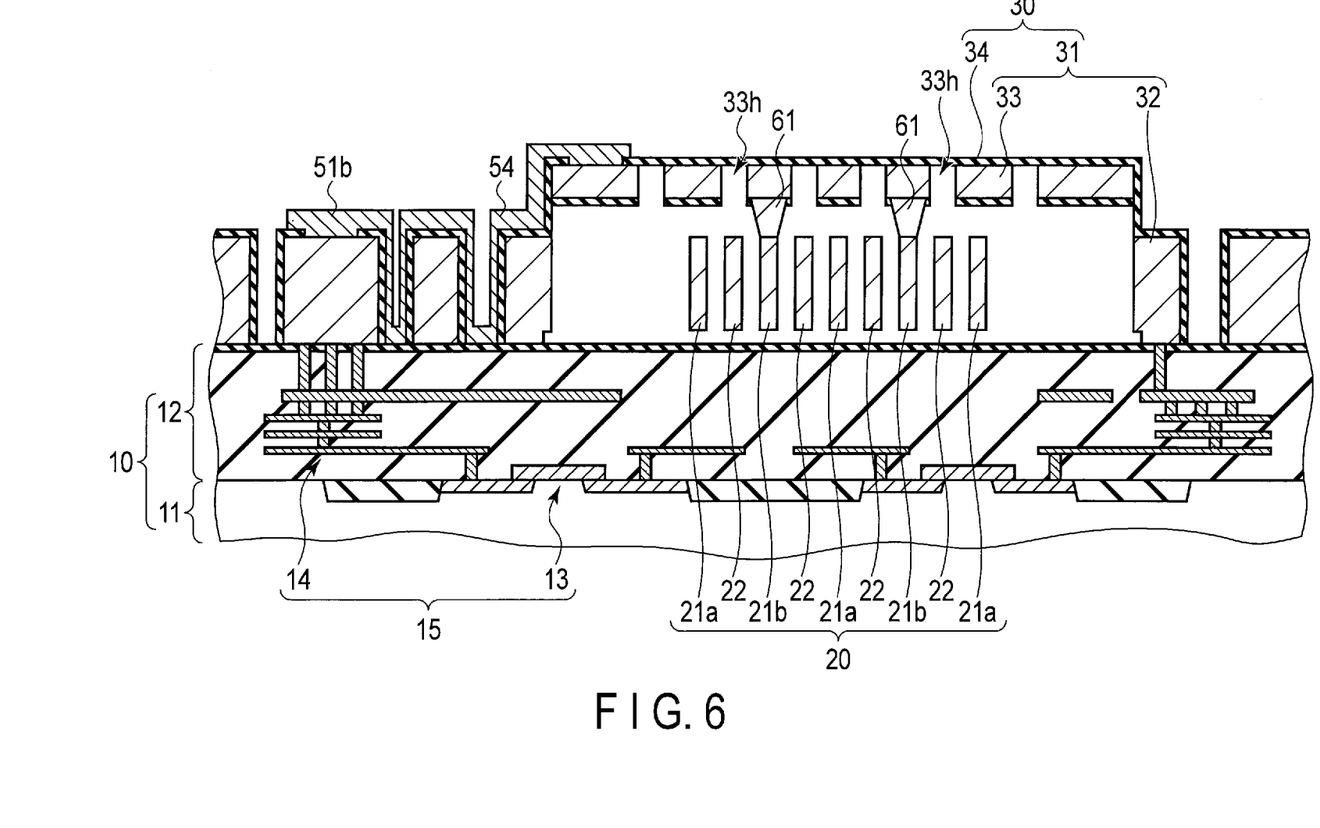
FIG. 6 is an exemplary sectional view of the structure of the electronic device of the third embodiment.

FIG. 5 is an exemplary plan view of the structure of the electronic device of the third embodiment. FIG. 6 is a sectional view taken along line A-A of FIG. 5. Note that a part of a protective film is omitted in the plan view of FIG. 5 for easier comprehension.

In the present embodiment, a first conductive portion 32 and a second conductive portion 33 are electrically insulated from each other. Further, fixed electrodes 21 include a first group (fixed electrodes 21a) electrically connected to the first conductive portion 32 and a second group (fixed electrodes 21b) electrically connected to the second conductive portion 33. Fixed electrodes 21a in the first group and fixed electrodes 21b in the second group are arranged alternately.

Fixed electrodes 21a are electrically connected to a pad electrode 51a via the first conductive portion 32 and an interconnect 14. Fixed electrodes 21b are electrically connected to a pad electrode 51b via the plugs 61, the second conductive portion 33 and an upper interconnect 54.

In the present embodiment, with the above-described structure, capacitance C1 between the movable electrode 22 and fixed electrode 21a adjacent thereto and capacitance C2 between the movable electrode 22 and fixed electrode 21b adjacent thereto can be detected separately. In this way, it becomes possible to perform differential detection of capacitance C1 and capacitance C2 and to increase the accuracy of acceleration detection.

Also in the present embodiment, a protective film 30 comprises a conductive portion 31 (first conductive portion 32 and second conductive portion 33), and the first conductive portion 32 is electrically connected to fixed electrodes 21a and the second conductive portion 33 is electrically connected to fixed electrodes 21b. Therefore, also in the present embodiment, it is possible to reliably connect fixed electrodes 21a and fixed electrodes 21b to the conductive portion 31 (first conductive portion 32 and second conductive portion 33) without performing a conventional difficult alignment operation. Consequently, it is possible to reliably connect fixed electrodes 21a and fixed electrodes 21b to pad electrode 51a and pad electrodes 51b electrically. Therefore, an electronic device comprising a variable capacitor having minute structures using MEMS technology can be reliably obtained.

Further, since the conductive portion 31 functions as a part of the protective film also in the present embodiment, it is possible to obtain an electronic device comprising a variable capacitor having minute structures using MEMS technology without significantly increasing the number of manufacturing processes.

Fourth Embodiment

Next, a method of manufacturing an electronic device of the fourth embodiment will be described. According to the manufacturing method of the present embodiment and manufacturing methods based on the present embodiment, electronic devices of the first to third embodiments can be manufactured. Note that, since basic points are similar to those of the first to third embodiments, the points described in the first to third embodiments will be omitted.

FIGS. 7 to 14 are exemplary sectional views of the method of manufacturing an electronic device of the present embodiment. The method of manufacturing an electronic device of the present embodiment will be described hereinafter with reference to FIGS. 7 and 14.

Figure 7:
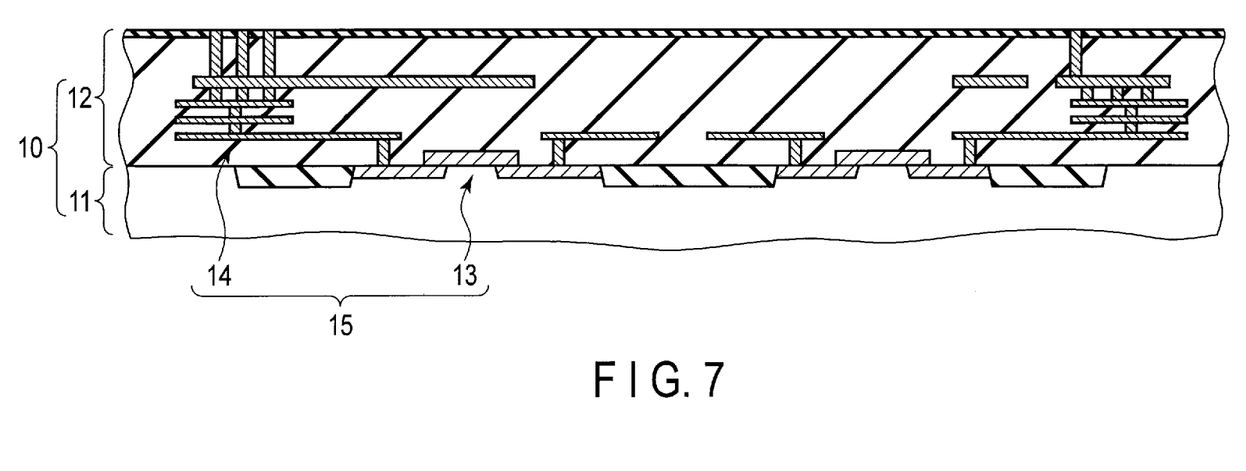
FIG. 7 is an exemplary sectional view of a part of the method of manufacturing an electronic device of a fourth embodiment.

First, as shown in FIG. 7, an underlying region 10 including a semiconductor substrate 11, an insulating region 12, a MOS transistor 13 and an interconnect 14 is formed.

Figure 8:
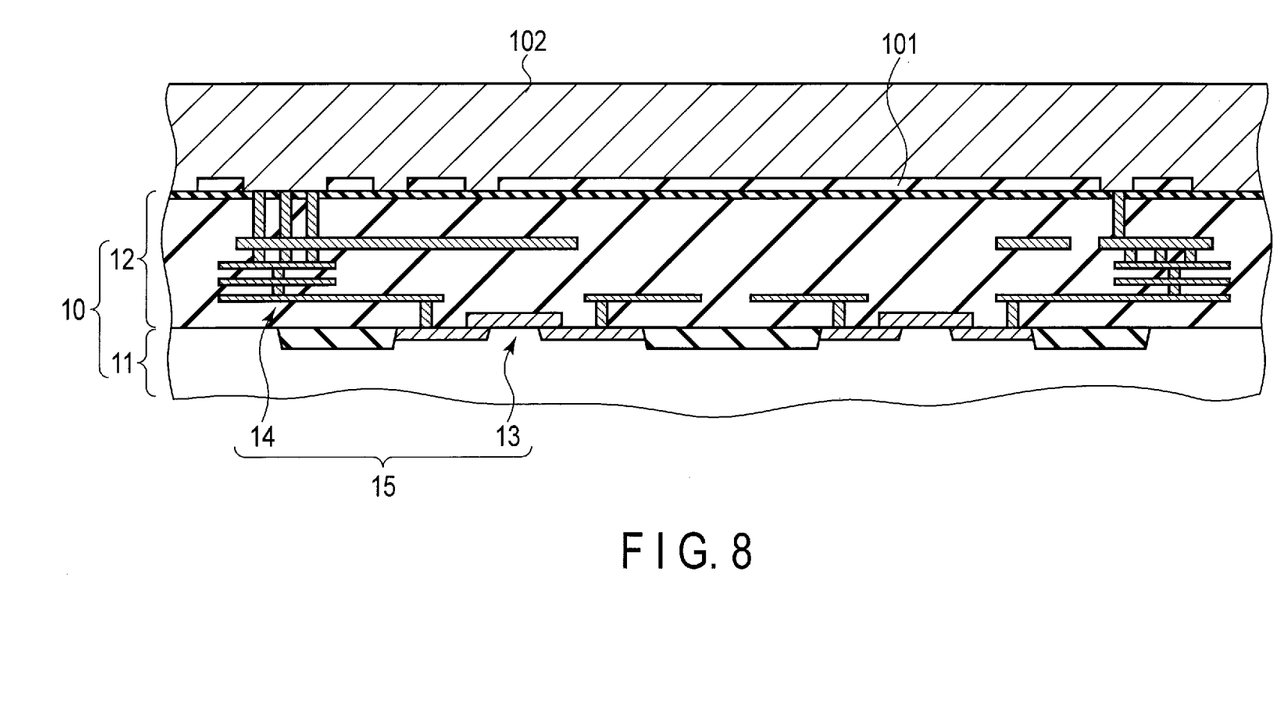
FIG. 8 is an exemplary sectional view of a part of the method of manufacturing the electronic device of the fourth embodiment.

Then, as shown in FIG. 8, a pattern of a silicon oxide film 101 is formed on the underlying region 10. On the underlying region 10 provided with the pattern of the silicon oxide film 101, a poly-SiGe layer 102 containing a p-type impurity is formed as a conductive material layer.

Figure 9:
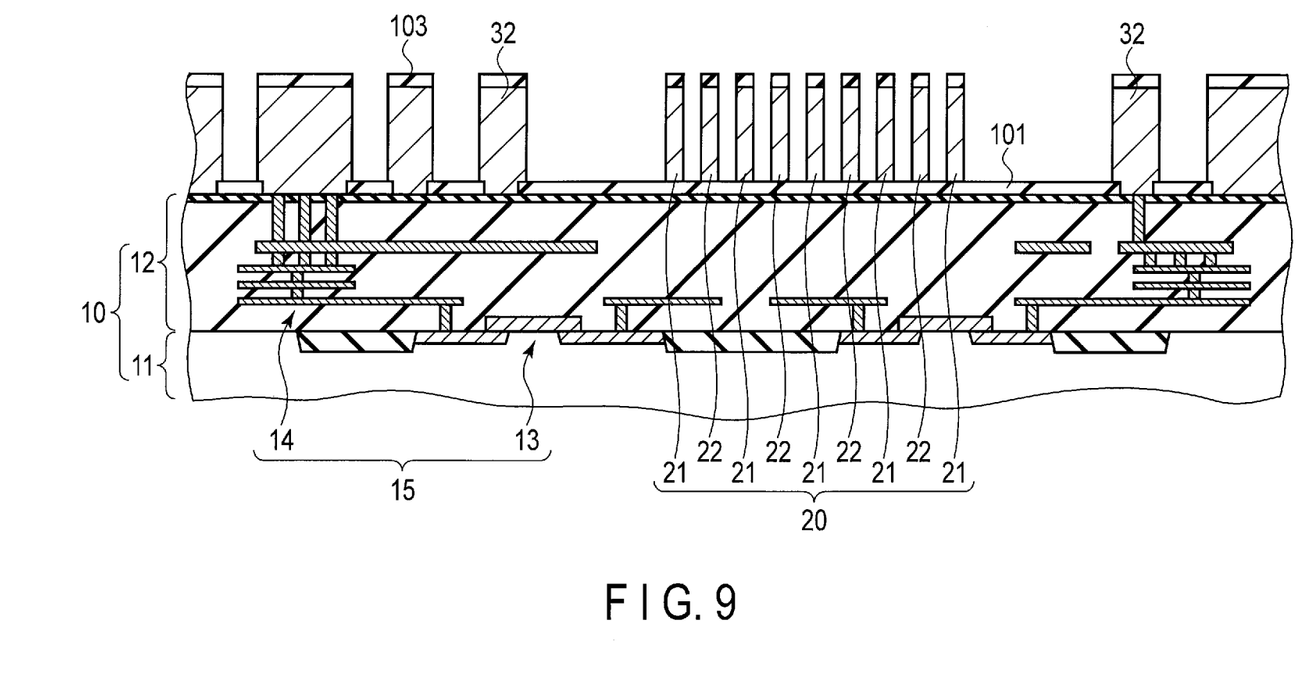
FIG. 9 is an exemplary sectional view of a part of the method of manufacturing the electronic device of the fourth embodiment.

Subsequently, as shown in FIG. 9, a silicon oxide film 103 is formed on the poly-SiGe layer 102. Further, the silicon oxide film 103 and the poly-SiGe layer 102 are patterned. In this way, patterns of fixed electrodes 21 and movable electrodes 22 of a variable capacitor are formed on the underlying region 10. At the same time, a pattern of a first conductive portion 32 connected to the fixed electrodes 21 is formed.

Figure 10:
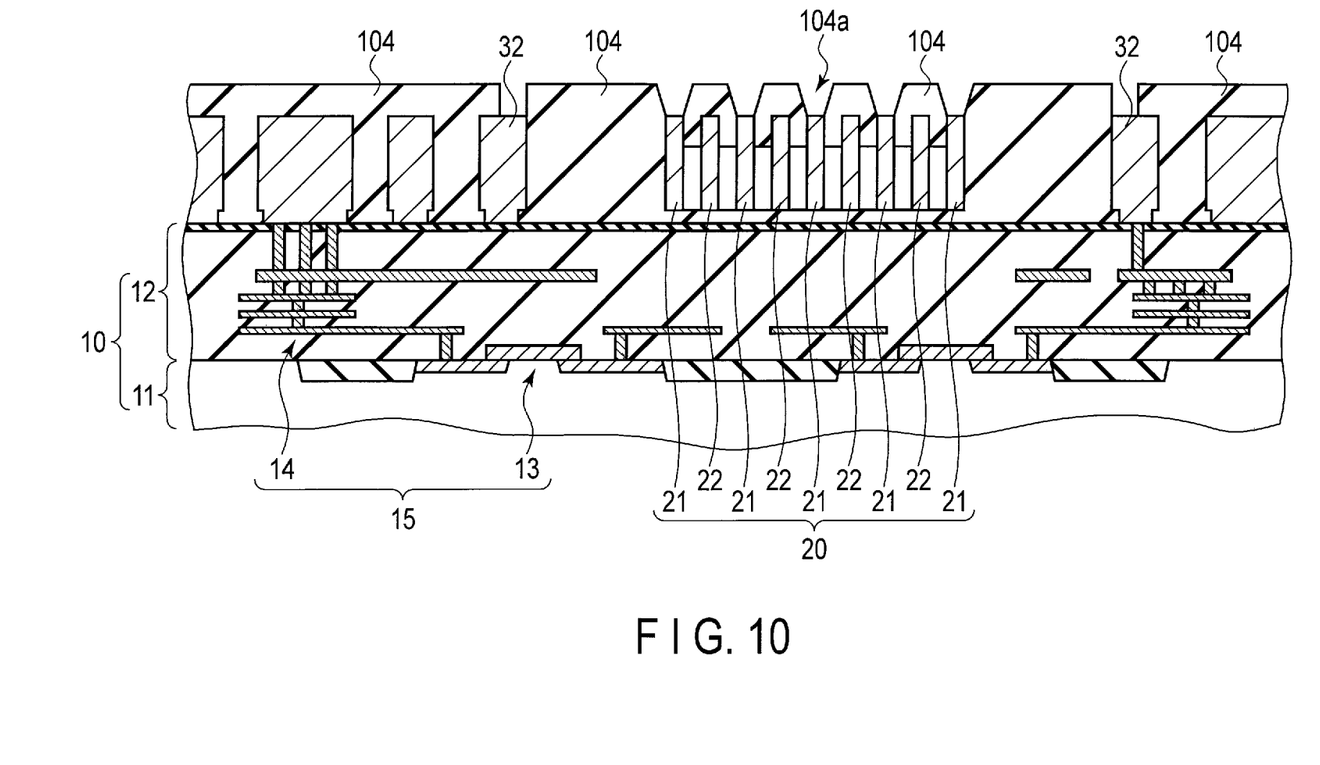
FIG. 10 is an exemplary sectional view of a part of the method of manufacturing the electronic device of the fourth embodiment.

Next, as shown in FIG. 10, a silicon oxide film is formed as a sacrificial film 104 on the underlying region 10 provided with the fixed electrodes 21 and the movable electrodes 22. Further, the sacrificial film 104 is patterned to form via holes 104a for plugs.

Figure 11:
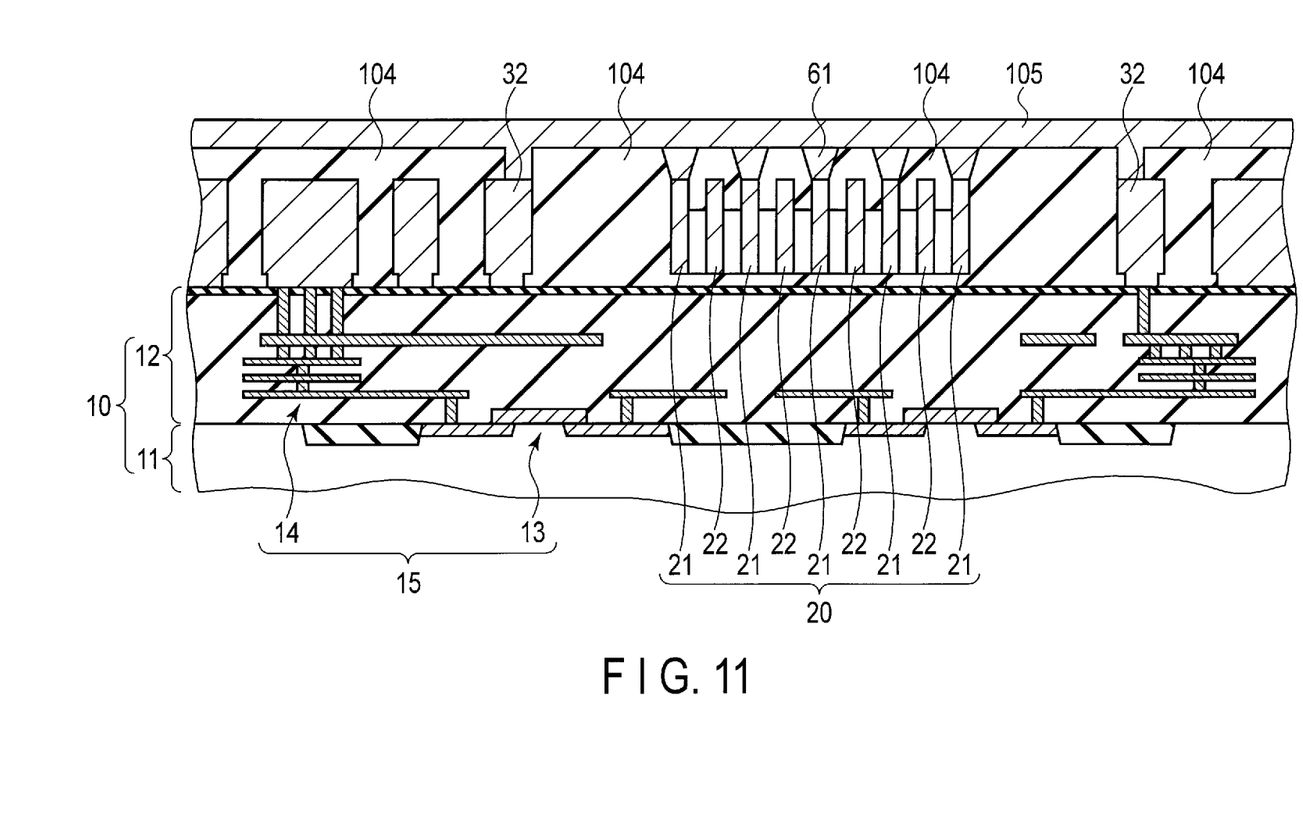
FIG. 11 is an exemplary sectional view of a part of the method of manufacturing the electronic device of the fourth embodiment.

Then, as shown in FIG. 11, plugs 61 are formed in the via holes 104a. On the entire surface including the silicon oxide film 104, a poly-SiGe layer 105 containing a p-type impurity is then formed.

Figure 12:
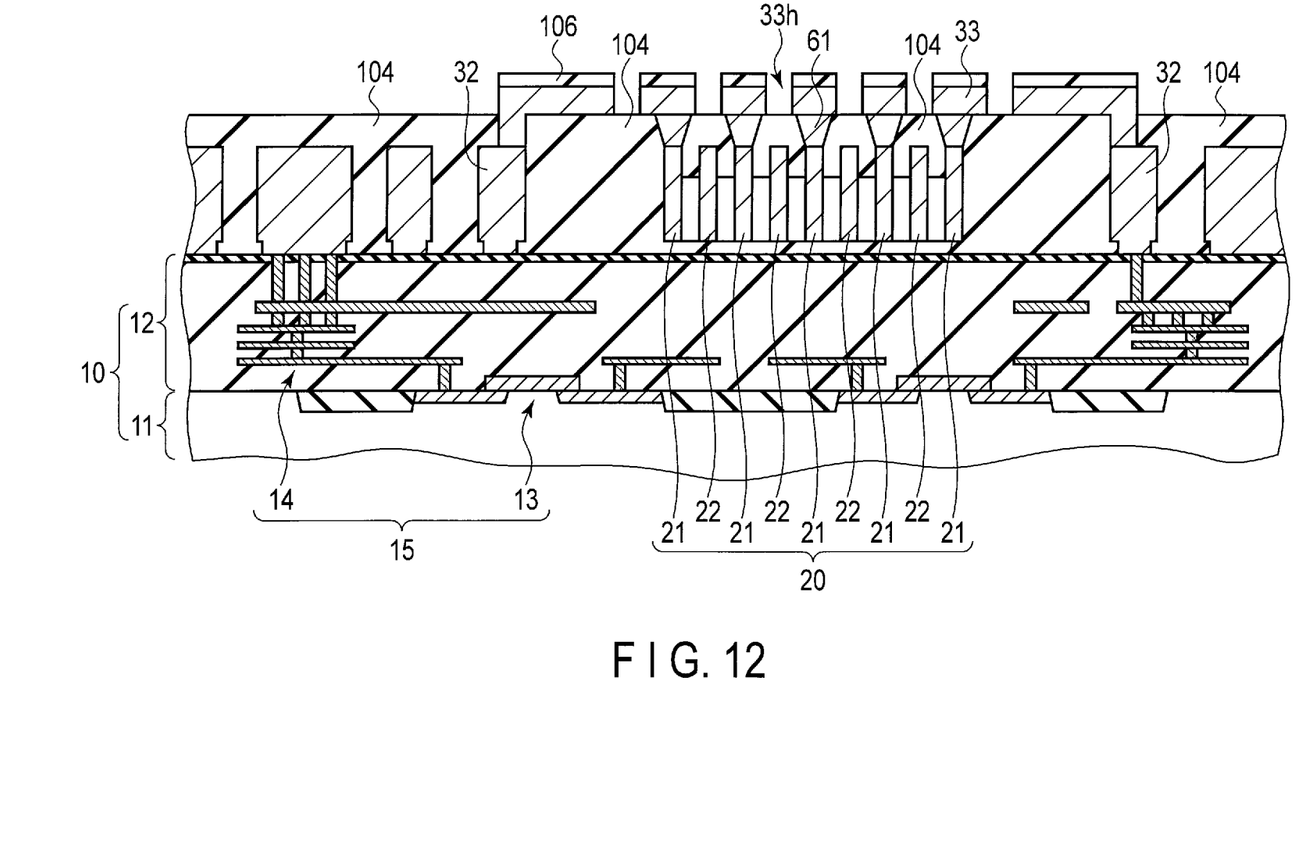
FIG. 12 is an exemplary sectional view of a part of the method of manufacturing the electronic device of the fourth embodiment.

Subsequently, as shown in FIG. 12, a silicon oxide film 106 is formed on the poly-SiGe layer 105. Further, the silicon oxide film 106 and the poly-SiGe layer 105 are patterned. In this way, a pattern of a second conductive portion 33 comprising holes 33h and electrically connected to the fixed electrodes 21 is formed on the silicon oxide film 104 and the plugs 61.

Figure 13:
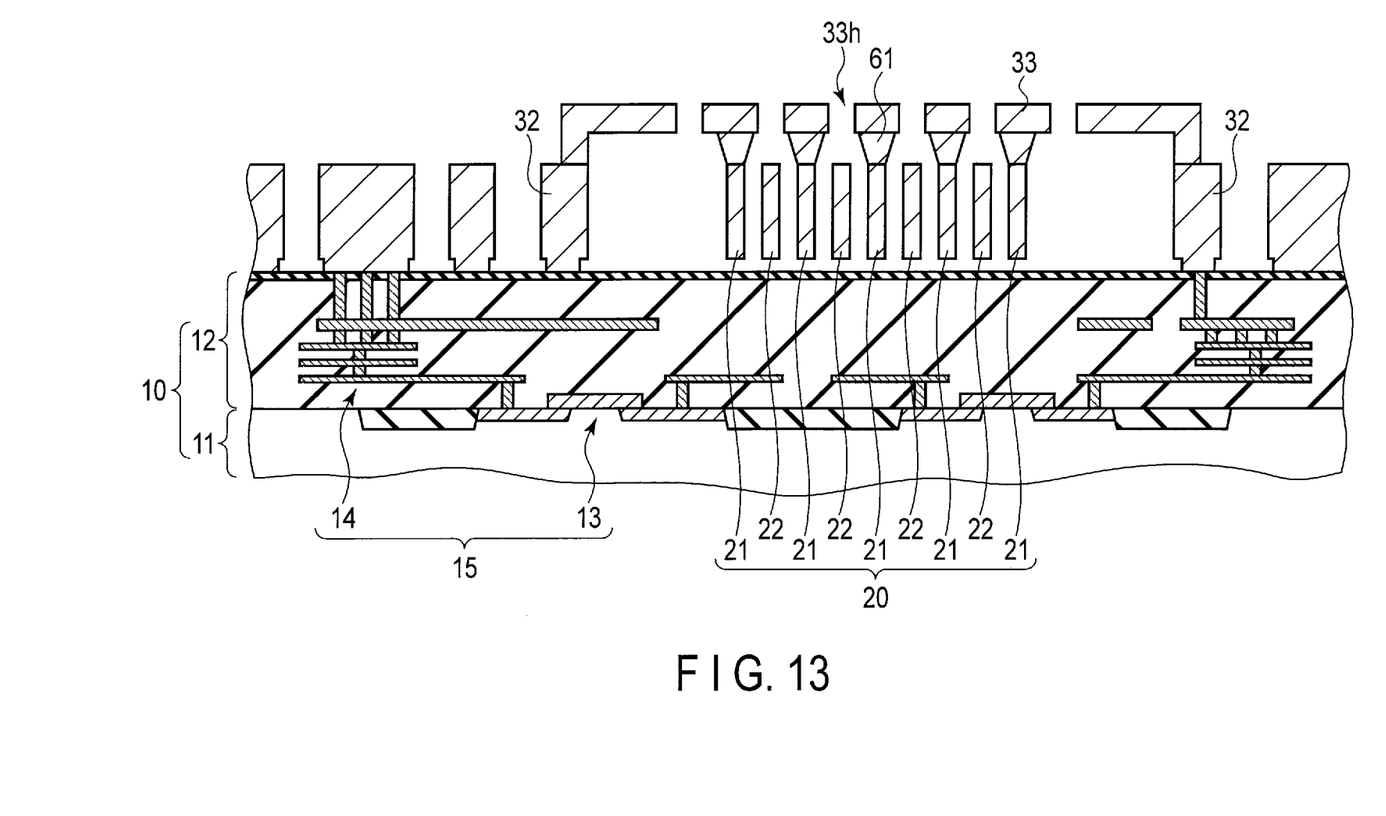
FIG. 13 is an exemplary sectional view of a part of the method of manufacturing the electronic device of the fourth embodiment.

Then, as shown in FIG. 13, the silicon oxide film 104 is etched and removed through the holes 33h.

Figure 14:
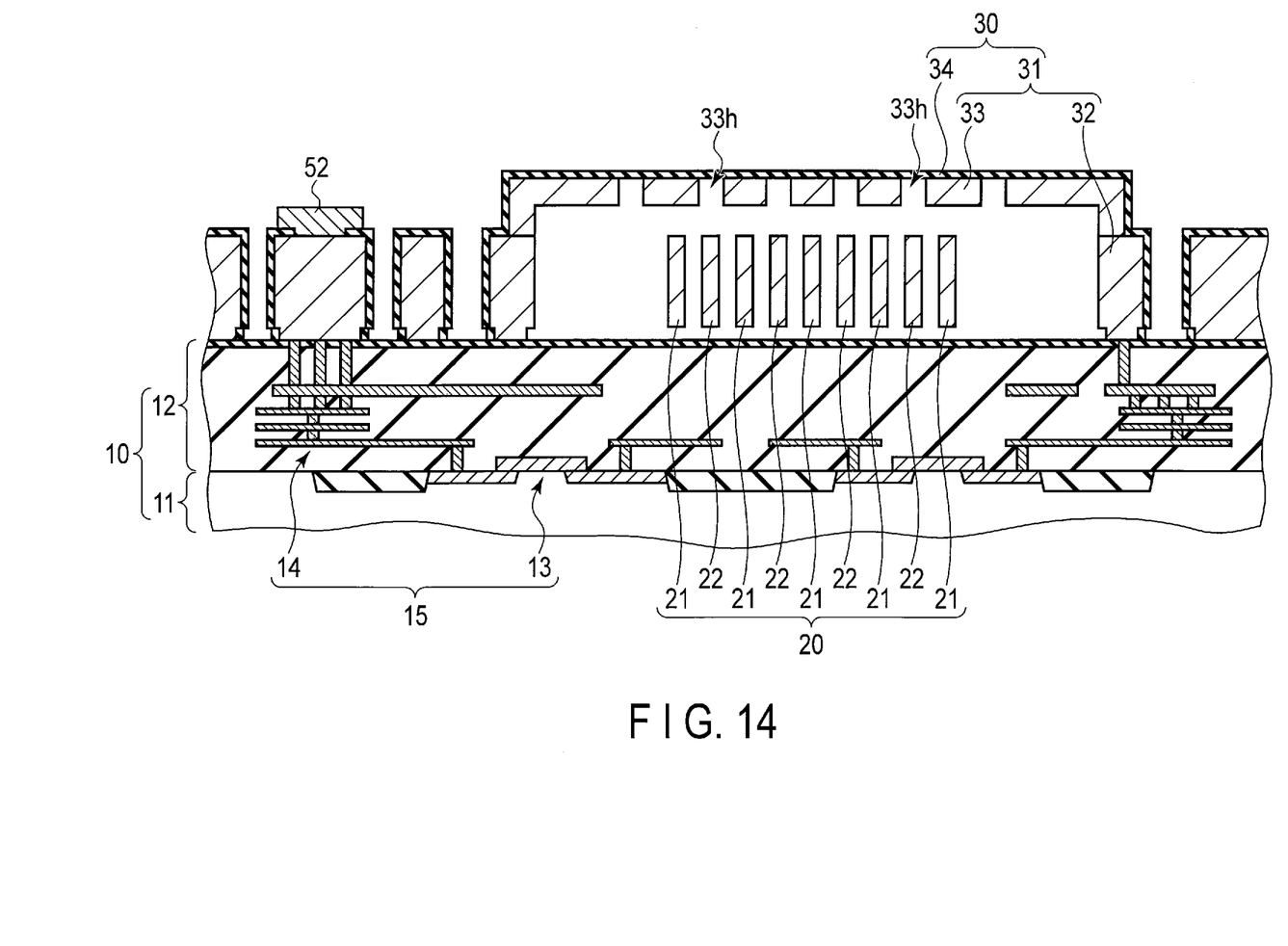
FIG. 14 is an exemplary sectional view of a part of the method of manufacturing the electronic device of the fourth embodiment.

Subsequently, as shown in FIG. 14, an upper layer portion 34 of a protective film 30 is formed. The upper layer portion 34 closes the holes 33h. Further, Pad electrodes 51 and 52 are formed.

In this way, the protective film 30 covering the fixed electrodes 21 and the movable electrodes 22 is formed. That is, the protective film 30 comprising a conductive portion 31 electrically connected to the fixed electrodes 21 and comprising holes 33h is formed.

From the above, according to the manufacturing method of the present embodiment, it is possible to reliably connect the fixed electrodes 21 to the conductive portion 31 and reliably connect the fixed electrodes 21 to pad electrode 51 electrically without performing a conventional difficult alignment operation. Therefore, an electronic device comprising a variable capacitor having minute structures using MEMS technology can be reliably formed.

Further, since the conductive portion 31 functions as a part of the protective film also in the present embodiment, it is possible to obtain an electronic device comprising a variable capacitor having minute structures using MEMS technology without significantly increasing the number of manufacturing processes.

Still further, according to the manufacturing method of the present embodiment, the patterns of the fixed electrodes 21 and the movable electrodes 22 and the pattern of the first conductive portion 32 are formed at the same time. Therefore, also for this reason, it becomes possible to obtain an electronic device comprising a variable capacitor having minute structures using MEMS technology without significantly increasing the number of manufacturing processes.

Note that the electronic device of each of the above-described embodiments may also be used as a gyro sensor instead of an acceleration sensor.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic device comprising:
an underlying region;
a variable capacitor including fixed electrodes and movable electrodes alternately arranged in a direction not perpendicular to a main surface of the underlying region; and
a protective film which covers the variable capacitor and includes a conductive portion electrically connected to the fixed electrodes and having a hole.

2. The electronic device of claim 1, wherein
the conductive portion includes a first conductive portion located in a sidewall portion of the protective film.

3. The electronic device of claim 1, wherein
the conductive portion includes a second conductive portion located in an upper portion of the protective film.

4. The electronic device of claim 3, wherein
the second conductive portion has the hole.

5. The electronic device of claim 3, wherein
the second conductive portion is electrically connected to the fixed electrodes via plugs.

6. The electronic device of claim 1, wherein
the conductive portion includes a first conductive portion and a second conductive portion electrically insulated from each other.

7. The electronic device of claim 6, wherein
the first conductive portion is located in a sidewall portion of the protective film, and the second conductive portion is located in an upper portion of the protective film.

8. The electronic device of claim 6, wherein
the fixed electrodes comprise a first group electrically connected to the first conductive portion and a second group electrically connected to the second conductive portion.

9. The electronic device of claim 8, wherein
the fixed electrodes in the first group and the fixed electrodes in the second group are alternately arranged.

10. The electronic device of claim 1, wherein
the conductive portion is formed of a semiconductor material.

11. The electronic device of claim 1, wherein
the movable electrodes are movable parallel to the direction in which the fixed electrodes and the movable electrodes are arranged.

12. The electronic device of claim 1, wherein
the protective film further includes an upper layer portion closing the hole.

13. The electronic device of claim 1, further comprising
a pad electrode electrically connected to the conductive portion.

14. The electronic device of claim 1, further comprising
a mass structure portion connected to the movable electrodes and having a pattern area greater than a total pattern area of the movable electrodes.

15. The electronic device of claim 1, wherein
a circuit including a transistor is provided in the underlying region.

* * * * *